No. 666,264. Patented Jan. 22, 1901.
J. F. DENISON.
VALVE FOR EXPLOSION ENGINES.
(Application filed Mar. 14, 1898.)
(No Model.)
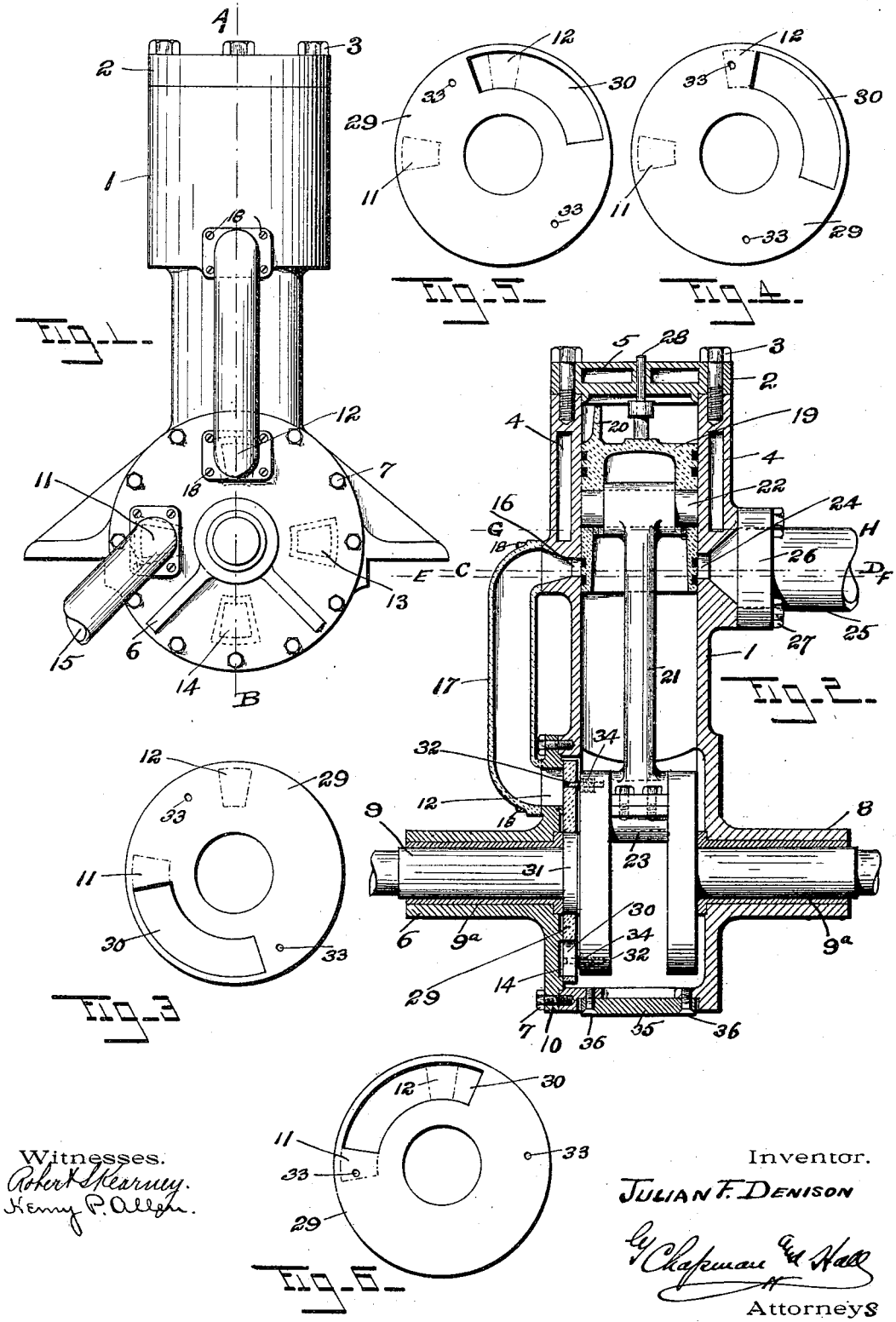
Witnesses.
Robert S. Kearney.
Henry P. Allen.
Inventor.
Julian F. Denison
By Chapman and Hall
Attorneys

United States Patent Office.

JULIAN F. DENISON, OF NEW HAVEN, CONNECTICUT, ASSIGNOR TO ANNIE B. DENISON, OF SAME PLACE, AND THE BACKUS WATER MOTOR COMPANY, OF NEW JERSEY.

VALVE FOR EXPLOSION-ENGINES.

SPECIFICATION forming part of Letters Patent No. 666,264, dated January 22, 1901.

Application filed March 14, 1898. Serial No. 673,797. (No model.)

*To all whom it may concern:*

Be it known that I, JULIAN F. DENISON, a citizen of the United States, residing at New Haven, in the county of New Haven and State of Connecticut, have invented certain new and useful Improvements in Valves for Explosive-Engines, of which the following is a specification, reference being had therein to the accompanying drawings.

My invention relates to improvements in valves for explosive-engines, and has for its object the construction of a rotary valve that will operate with the minimum amount of friction, will be sure and positive in its operation, and can be constructed of few parts of simple design that can be manufactured at a slight cost.

To this end my invention consists of the rotary valve and its coöperating parts, as herein fully set forth, and more particularly pointed out in the claim.

Referring to the drawings, in which like parts are designated by like characters in the several figures, Figure 1 is a front elevation of an explosive-engine embodying my invention. Fig. 2 is a transverse section of Fig. 1 upon line A B. Figs. 3, 4, 5, and 6 are elevations of the rotary valve.

The numeral 1 designates the cylinder of an ordinary gas or explosive engine, and 2 the cylinder-head, bolted to the top of the cylinder by the bolts 3. Within the cylinder-jacket and the cylinder-head are the usual water-chambers 4 and 5 for cooling the cylinder.

Attached by means of the bolts 7 to the lower portion of the frame of the engine is the separate cover-plate having a crank-shaft bearing 6, which is concentric with the integral bearing 8 upon the opposite side of the frame. The crank-shaft 9, consisting of two shafts provided with wrist-plates at their inner ends within the compression-chamber and connected by an interposed wrist-pin, is mounted in the said bearings 6 and 8 and rotates in the bushings 9ª 9ª, placed within the bore of said bearings. Through the flange 10 of the combined cover-plate and bearing 6 are the ports 11 12, port 11 being for the admission of gas to the interior of the compression-chamber, and port 12 being provided to allow the escape of the gas from the compression-chamber and into the interior of the cylinder. The ports 11 and 12 are located upon the flange 10 at an angle of substantially ninety degrees from each other and project slightly within the casing to form bearing-surfaces for the valve, and dummy ports 13 14 are provided diametrically opposite each of said ports 11 and 12, so as to form a bearing-surface for the said rotary valve at each of the four quarters of its revolution, thereby insuring a perfect contact with the least possible bearing-surface. An inlet-pipe 15 connects the port 11 with any source of gas-supply, the gas and air being mixed in proper proportions before they reach the said port 11. It is common in the art to connect one or more of these inlet-ports, which are usually near enough together to form one port, with pipes conveying gas and air respectively. This construction can be used in my engine without altering the arrangement of the parts thereof. Connecting the port 12 and the port 16 in the cylinder is the conduit 17, attached to the flange 10 and the cylinder 1 by the screws 18.

The numeral 19 designates the piston, upon the upper surface of which is the deflector 20, and 21 designates the connecting-rod loosely connected to the said piston by the shaft 22 and to the wrist-pin of the crank-shaft by the split bearing 23.

Opposite the port 16 in the cylinder is the exhaust-port 24, leading into the exhaust-pipe 25, which is secured to the cylinder by means of the collar 26 and bolts 27.

Suspended from the cylinder-head 2 is the sparker 28, which may be of any ordinary construction, the particular mechanism to operate which I have not shown, it not being essential to the operation of my invention.

The rotary valve 29 is a circular disk, preferably made from a casting, but may be formed from sheet metal, and is provided with an opening 30, forming the segment of a circle, the ends of which are substantially ninety degrees from each other.

The rotary valve 29 is loosely mounted upon the collar 31 of the crank-shaft and is interposed between the wrist-plate thereof and the cover-plate and is driven by the pins 32 32, which are set in the side of the wrist-plate and extend through the holes 33 33 in the rotary valve. Springs 34 34 surround the pins 32 32 and press against the side of the valve 29 with just sufficient pressure to keep it against its seat, thus insuring an operative device with the least possible friction. The bore of the said valve 29 is rounded from front to rear, (see Fig. 2,) which allows the valve to accommodate itself to the valve-seat if by wear or otherwise it should not remain at a right angle to the axis of the said crank-shaft.

The operation of my improved rotary valve is as follows: In Fig. 2 I have shown the piston in its extreme upward position just as the gas in the cylinder is about to be exploded by the sparker 28. The position of the rotary valve at this part of the stroke is shown in Fig. 3, both of the ports 11 and 12 being covered by the solid part of the valve. In Figs. 3, 4, 5, and 6 I have shown by broken lines the position of the ports 11 and 12 and the position of the rotary valve 29 in relation thereto at different parts of the stroke. As the piston 19 is driven down by the force of the explosion and the top of the same reaches that portion of the cylinder designated by the broken line C D the port 16 and exhaust-port 24 are almost wide open and the rotary valve 29 is in the position shown in Fig. 4, just commencing to open the port 12. As soon as the exhaust-port 24 is opened the product of the exploded gas escapes through the exhaust-pipe 25 into the open air. When the top of the piston 19 is in its extreme downward position, (designated by the line E F,) the ports 16, 24, and 12 are wide open and gas from the compression-chamber in the lower part of the frame is passing through the port 12, conduit 17, and port 16 into the cylinder. As the gas enters the cylinder it strikes against the deflector 20, which deflects it upward and drives out the products of the explosion L through the exhaust-port 24 and pipe 25. The rotary valve 29 at this portion of the stroke is shown in Fig. 5, the port 12 being uncovered and the port 11 covered. The piston 19 now moves upward and closes the ports 16 and 24, thereby shutting off the supply of gas from the compression-chamber, and at the same time compresses the gas in the cylinder above the piston. When the piston reaches that portion of the cylinder designated by the broken line G H, the rotary valve 29 begins to uncover the port 11, and the gas is drawn into the compression-chamber through the inlet-pipe 15 and port 11 by the action of the piston, which is continually rising, thereby causing a vacuum in the compression-chamber and drawing in the gas by suction. The port 11 remains uncovered until the piston has nearly completed its upward stroke, when it is closed by the solid portion of the valve covering the port and the gas-supply is shut off. It will be noticed that when the port 11 is uncovered the port 12 also remains uncovered for a portion of the stroke. This uncovering of the two ports at the same time does not affect the operation of the engine, as the inlet-port 16 to the cylinder is closed by the piston. Hence no gas can escape from the compression-chamber into the cylinder. That lower portion of the frame of the engine which I have termed the "compression-chamber" fills with gas during the upward stroke of the piston, and as the piston descends the gas in this chamber is compressed until the ports 12 and 16 are opened at the extreme downward position of the stroke, when the compressed gas rushes through the conduit 17 and port 16 into the top of the cylinder. The lower portion of the compression-chamber is closed by the cap 35, fastened to the frame by the screws 36 36.

The valves now common to gas-machines are usually constructed to operate by means of springs, levers, cams, &c., which are cumbersome in appearance, not positive in their operation, and require a large number of parts upon the outside of the machine to insure ready repairs. A number of these valves are operated by means of suction that opens the valve against the compression of a spring, and after a predetermined amount of gas has been admitted the expansion of the spring closes them. These valves frequently become inoperative owing to dirt, oil, or other foreign matter forming upon their seat and causing them to stick, and, again, the spring that closes the valve is liable to break and stop the engine even if no further damage results. All of these objections are overcome in my valve, which is sure and positive in its operation, admits the same quantity of gas at every revolution of the crank-shaft, and is constructed of the fewest possible parts and those of the simplest design. My rotary valve is contained within the frame of the engine, and as there are no moving parts outside of the frame the risk of breakage is reduced to a minimum and the engine can be operated by the most inexperienced persons.

It is obvious that there are many minor changes that can be made within the spirit and scope of my invention, such as varying the length and size of the opening in the valve, arranging the ports in different positions than those herein shown, &c., and I would therefore have it understood that I do not limit myself to the exact construction herein shown and described, but claim all that falls fairly within the spirit and scope of my invention.

What I claim as new, and desire to secure by Letters Patent, is—

An explosive-engine comprising a frame or casing constructed as a cylinder at one end having inlet and outlet ports therein, a compression-chamber at the other end of said casing open at one side, and its opposite side constructed as an integral bearing, an independent cover-plate for the open side of said compression-chamber constructed as a bearing and provided with an inlet and an outlet port each terminating in a raised bearing or seat within the casing, and dummy ports on said cover-plate forming bearings or seats corresponding to the port bearings or seats, a passage connecting the outlet of the cover-plate with the inlet of the cylinder, shafts arranged in the bearings of the compression-chamber and provided with wrist-plates on their inner ends within said chamber, a wrist-pin interposed between and connecting said wrist-plates, a piston in said cylinder, and a rod connecting said piston and wrist-pin for rotating said shafts, combined with a valve constructed as a disk loosely arranged upon one of said shafts and interposed between the wrist-plate thereof and the cover-plate and engaging the bearings or seats thereon, means for rotatably and slidably connecting said valve with the wrist-plate and its shaft respectively, and a segmental opening through said valve adapted to communicate with the inlet and outlet ports in the cover-plate upon rotation of the valve, substantially as and for the purpose described.

In testimony whereof I affix my signature in presence of two witnesses.

JULIAN F. DENISON.

Witnesses:
J. PETER DEJON,
GEORGE E. HALL.